(12) United States Patent
Menadeva et al.

(10) Patent No.: US 8,290,279 B2
(45) Date of Patent: Oct. 16, 2012

(54) METHOD, A SYSTEM, AND A COMPUTER PROGRAM PRODUCT FOR PROCESSING IMAGES

(75) Inventors: Ovadya Menadeva, Modiin (IL); Avi Mandelberg, Tel-Aviv (IL)

(73) Assignee: WaniB, Tel-Aviv (IL)

( * ) Notice: Subject to any disclaimer, the term of this patent is extended or adjusted under 35 U.S.C. 154(b) by 851 days.

(21) Appl. No.: 12/392,202

(22) Filed: Feb. 25, 2009

(65) Prior Publication Data

US 2009/0220149 A1    Sep. 3, 2009

Related U.S. Application Data

(60) Provisional application No. 61/031,029, filed on Feb. 25, 2008.

(51) Int. Cl.
*G06K 9/48* (2006.01)
*G06K 9/40* (2006.01)

(52) U.S. Cl. .......................................... 382/199; 382/266

(58) Field of Classification Search ................... 382/100, 382/165, 199, 203, 266, 282, 283
See application file for complete search history.

(56) References Cited

U.S. PATENT DOCUMENTS

| 5,832,115 A * | 11/1998 | Rosenberg ..................... 382/199 |
| 2006/0126924 A1 * | 6/2006 | Liu et al. ....................... 382/154 |
| 2009/0220149 A1 * | 9/2009 | Menadeva et al. ............ 382/165 |

* cited by examiner

*Primary Examiner* — Yon Couso
(74) *Attorney, Agent, or Firm* — Reches Patents

(57) ABSTRACT

A method for processing an image of a person, the method including: (i) defining a first search area in response to a value of a metric parameter and to a location of an element of interest within the image; (ii) generating an edge detection data structure, wherein some of the elements of the edge detection data structure are indicative of edges of the image which are located within an edge detection search area that is contained within the first search area; (iii) determining a contour path in the edge detection data structure in response to multiple edges of the edge detection data structure, wherein the contour path includes a single data structure element from each column of the data structure; and (iv) retrieving a face portion of the image, wherein the face portion is included within a mask that is responsive to the contour path.

23 Claims, 16 Drawing Sheets

510 detecting a central face area of an image of a person 511 detecting a left eye area, a right eye area, an eyes area, a mouth area, or any combination of two or more of those areas 512 determining at least one color parameter by processing colors of the central face area 520 Defining a first search area in response to at least one metric parameter and to at least one location within the image 521 determining the value of the metric parameter in response to locations of areas of stage 511

530 Generating an edge detection data structure that includes information indicative of edges of the image that are located within an edge detection search area that is contained within the first search area 531 generating an intensity data structure, wherein each column of the intensity data structure includes color information representative of a one-dimensional section of the edge detection search area 532 applying noise reduction to the intensity data structure 533 Determining, for each of the columns of the intensity data structure, a data structure element that corresponds to a maximal absolute value of derivatives of color values along the one-dimensional section 540 determining a contour path in the edge detection data structure in response to multiple edges of the edge detection data structure, wherein the contour path includes a single data structure element from each column of the data structure 541 Consecutively selecting a contour path element in a column of the edge detection data structure in response to a contour path segment that was determined for previous columns of the edge detection data structure 542 masking the edge detection data structure for removing areas corresponding to the central face area 543 masking the edge detection data structure for removing areas corresponding to areas of the image that are within a color range that is responsive to colors of the central face area 550 Retrieving a face portion of the image, wherein the face portion is included within a mask that is responsive to the contour path 560 transforming face portion to fit a target space that is included in a target image, and incorporating the face portion into the target space, to provide a modified target image 5100 creating a physical artifact that is responsive to the face portion

FIG. 2      500

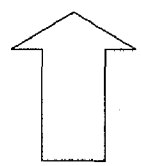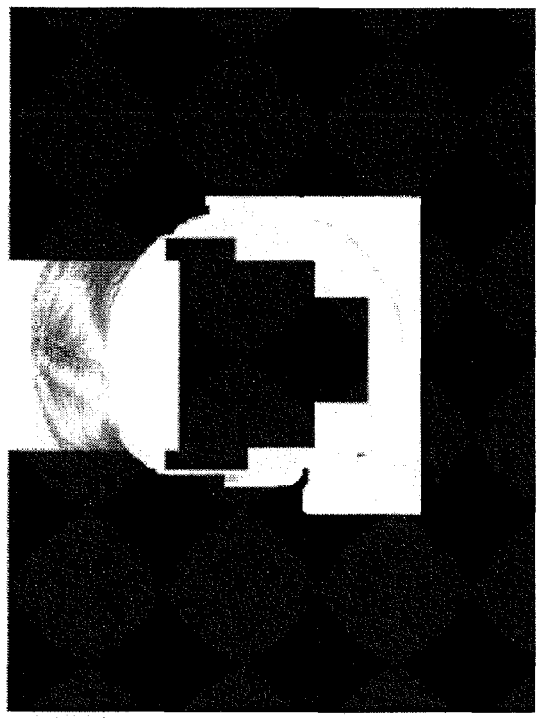
FIG. 7

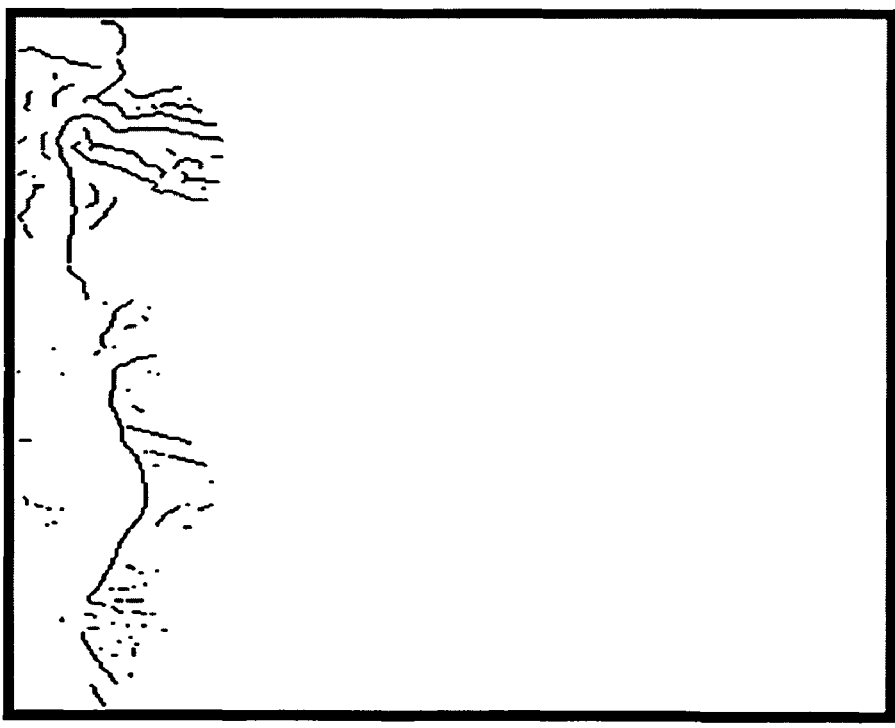
FIG. 8A

100A
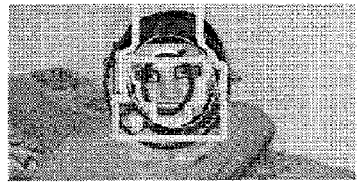
100B
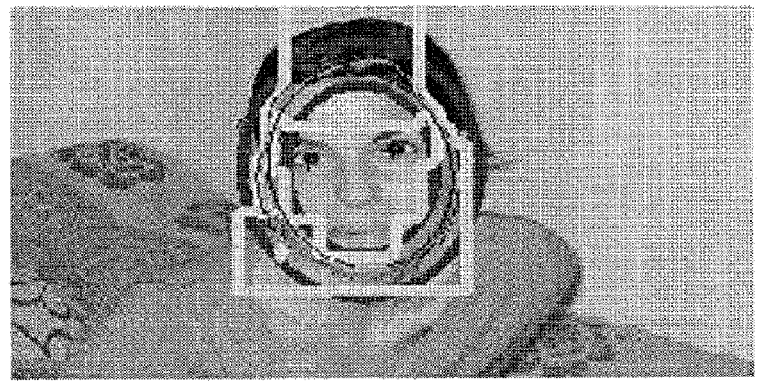
FIG. 10

METHOD, A SYSTEM, AND A COMPUTER PROGRAM PRODUCT FOR PROCESSING IMAGES

CROSS REFERENCE TO RELATED APPLICATIONS

This application claims the benefit of U.S. Provisional Patent Application No. 61/031,029, filed on Feb. 25, 2008, entitled "AUTOMATIC GENERATION OF CARTOON IMAGES", which is incorporated in its entirety herein by reference.

BACKGROUND OF THE INVENTION

In prior art, typically a cartoon image of a person, is created by hand, by an artist or a draftsman, who may work from a photograph or from a live model, to exaggerate certain features of a person's face or body and obtain a cartoon image. The process is most often done using either pen and paper or image-handling software. The coloring of the image is altered, and the artist may choose the background of the image, to obtain a maximal satirized effect.

If computerized images are to be created using image-handling software (e.g. Photoshop®, manufactured by Adobe®), the draftsman nevertheless must draw on-screen in free-hand, or must instruct the software repeatedly where to place the contours of the image, how to change the colors, how to resize the image, etc. For instance, U.S. Pat. No. 6,351,265 to Bulman, requires a user to demarcate the head of the image by selecting several reference points such as chin or neck, and the user must resize the head manually, if necessary (see examples 2, 3, 5). There is no enablement in U.S. Pat. No. 6,351,265 for automatically performing these steps without user intervention.

Prior art software requires a user to circle or mark the borders of the face onscreen, using computer peripherals such as a mouse or computer-related pen. Other prior art software requires the user to select the general face shape of the digital photo, from a database of facial shapes, in order to perform the "cut and paste". The disadvantage of the prior art facial shape database method, lies in the multitude of inexact results, since often the face will be inaccurately cut off, leaving an uneven and unprofessional result.

There is a need for simple and effective systems, methods, and computer program products, for an exact extraction of faces from images.

SUMMARY OF THE INVENTION

A method for processing an image of a person, the method including: (i) defining a first search area in response to a value of a metric parameter and to a location of element of interest within the image; (ii) generating an edge detection data structure, wherein some of the elements of the edge detection data structure are indicative of edges of the image which are located within an edge detection search area that is contained within the first search area; (iii) determining a contour path in the edge detection data structure in response to multiple edges of the edge detection data structure, wherein the contour path includes a single data structure element from each column of the data structure; and (iv) retrieving a face portion of the image, wherein the face portion is included within a mask that is responsive to the contour path.

A system for processing an image of a person, the system including: (i) a network interface, configured for reception of the image; and (ii) a processor, adapted to: (a) define a first search area in response to a value of a metric parameter and to a location of an element of interest within the image; (b) generate an edge detection data structure, wherein some of the elements of the edge detection data structure are indicative of edges of the image which are located within an edge detection search area that is contained within the first search area; (c) determine a contour path in the edge detection data structure in response to multiple edges of the edge detection data structure, wherein the contour path includes a single data structure element from each column of the data structure; and (d) retrieve a face portion of the image, wherein the face portion is included within a mask that is responsive to the contour path.

A computer readable medium having a computer readable code for processing images incorporated therein, the computer readable code including instructions for: (a) defining a first search area in response to a value of a metric parameter and to a location of an element of interest within the image; (b) generating an edge detection data structure, wherein some of the elements of the edge detection data structure are indicative of edges of the image which are located within an edge detection search area that is contained within the first search area; (c) determining a contour path in the edge detection data structure in response to multiple edges of the edge detection data structure, wherein the contour path comprises a single data structure element from each column of the data structure; and (d) retrieving a face portion of the image, wherein the face portion is included within a mask that is responsive to the contour path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2, 3, and 4 illustrate different methods for processing an image of a person, according to several embodiments of the invention;

FIG. 7 illustrates masking of an image according to an embodiment of the invention;

FIGS. 8A, and 8B illustrate edge detection matrices, according to an embodiment of the invention;

FIG. 10 illustrates an image in two different scales; and

Figure 1:
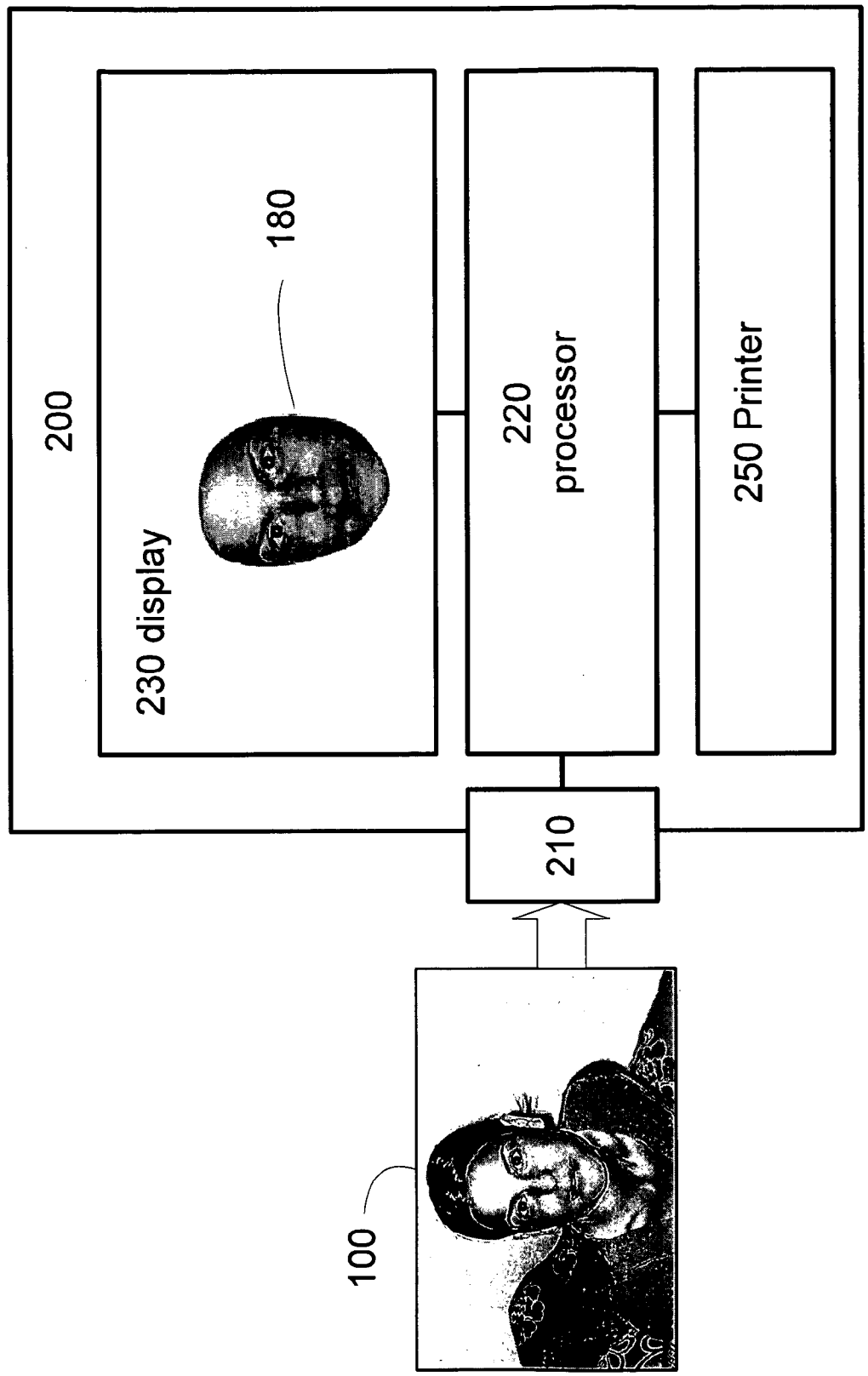
FIG. 1 illustrates a system for processing an image of a person, according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

FIG. 1 illustrates a system 200 for processing an image of a person, according to an embodiment of the invention. System 200 includes communication interface 210, processor 220, and potentially output component such as (though not necessarily) display 230. Communication interface 210 is conveniently configured for reception of an image on which the processing is carried out. Processor 220 is adapted to: (a) define a first search area in response to a value of a metric parameter and to a location of an element of interest within the image; (b) generate an edge detection data structure, wherein some of the elements of the edge detection data structure are indicative of edges of the image which are located within an edge detection search area that is contained within the first search area; (c) determine a contour path in the edge detection data structure in response to multiple edges of the edge detection data structure, wherein the contour path includes a single data structure element from each column of the data structure; and (c) retrieve a face portion of the image, wherein the face portion is included within a mask that is responsive to the contour path.

It is noted that conveniently, system 200 is configured to implement and/or carry out method 500 for the processing of the image, even that this is not necessarily so. Further more, different embodiments of system 200 are configured to implement and/or carry out different embodiments of method 500, even if not explicitly elaborated, and vise versa. It is further noted that according to different embodiments of the invention, system 200 is configured to carry out method 500, 600, and/or 700, and different embodiments thereof.

FIG. 2 illustrates method 500 for processing an image of a person, according to an embodiment of the invention. It is noted that method 500 is conveniently implemented for frontal takes of the person (or at least of the face thereof), but this is not necessarily so.

In case there is more than one face in the image, it is noted that method 500 may be implemented for one or more of those faces. It is noted that method 500 may be implemented for different types of images (e.g. color, grayscale, vector, raster, compressed, non-compressed, and so forth), with the required modifications. The term color below may be used for different color-related parameters, both in color images and in grayscale/monochrome/B/W images, depending on context. For example, in a grayscale image (as well as in color image), the term color may be used to refer to intensity, or luminance.

It is noted that method 500 refers to an image that may be received from an external source, and may be acquired by the same system which carries out the processing as disclosed (e.g. by a digital camera, etc.).

According to an embodiment of the invention, method 500 starts with stage 510 of detecting a central face area of the image of the person. It is noted that the central face area may also be provided by an external source. The central face area is usually an area in which the nose of the person, the eyes of the person and the mouth of the person are included. It is noted that generally, whenever referring to parts of the human face that are included within an area of the image, it is meant that a representation of that part of the face is located within the mentioned area of the image. It is noted that according to different embodiments of the invention, the central face area may include different portions of the face of the person. Additionally, it is noted that for a single embodiment, central face area of different images may include different portions of the face of the person depicted. It is noted that prior art algorithms for detecting the central face area such as the Viola-Jones algorithm may be used.

Figure 5:
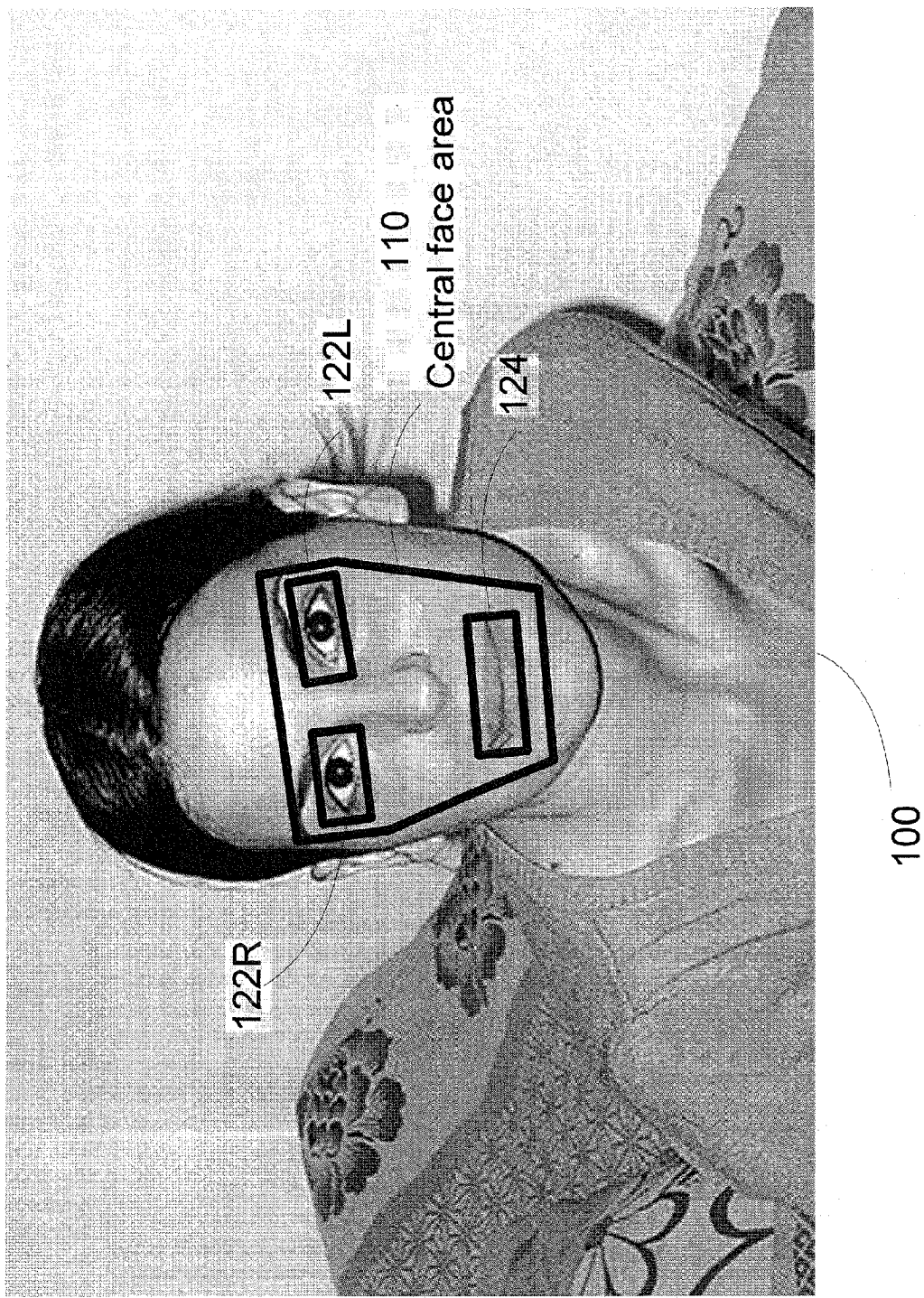
FIG. 5 illustrates an image according to an embodiment of the invention.

Referring to FIG. 5, the central face area according to an embodiment of the invention is represented by frame 110. It is noted that the central face area may be a rectangle, but this is not necessarily so.

According to an embodiment of the invention, stage 510 includes stage 511 of detecting a left eye area, a right eye area, an eyes area, a mouth area, or any combination of two or more of those areas. For example, referring to FIG. 5, the left eye area according to an embodiment of the invention is represented by frame 122L, the right eye area according to an embodiment of the invention is represented by frame 122R, and the mouth area according to an embodiment of the invention is represented by frame 124. It is noted that the areas detected in stage 511 may be detected together with the central face area, or separately from which. Also, the detecting of the areas of stage 511 may be responsive to the detected central face area, and the opposite may also be implemented—the detecting of the central face area may depend on previously detected areas of stage 511.

According to an embodiment of the invention, the detecting of stage 511 is carried out by using derivatives and/or gradients over the central face area, but this is not necessarily so. It is noted that usually, the colors of those areas is significantly different from those of the rest of the face.

It is noted that the detecting of such areas may be accompanied or followed by determining a location within an element of interest within the central face area, but this is not necessarily so. For example, locations such as centers of the eyes may be determined.

According to an embodiment of the invention, the detecting of the central face area may be followed by stage 512 of determining at least one color parameter by processing colors of the central face area. This may be used for determining a face color parameters, e.g. for assisting in removing areas which are not in the color of the flash. For example, a mean tone and a standard deviation may be determined. It is noted that, according to an embodiment of the invention, at least one of the color parameters is determined by processing colors of the central face area from which one or more of the areas of stage 511 (e.g. mouth area and eyes areas) was discarded (e.g. for eliminating different colors of mouth and eyes).

Figure 6:
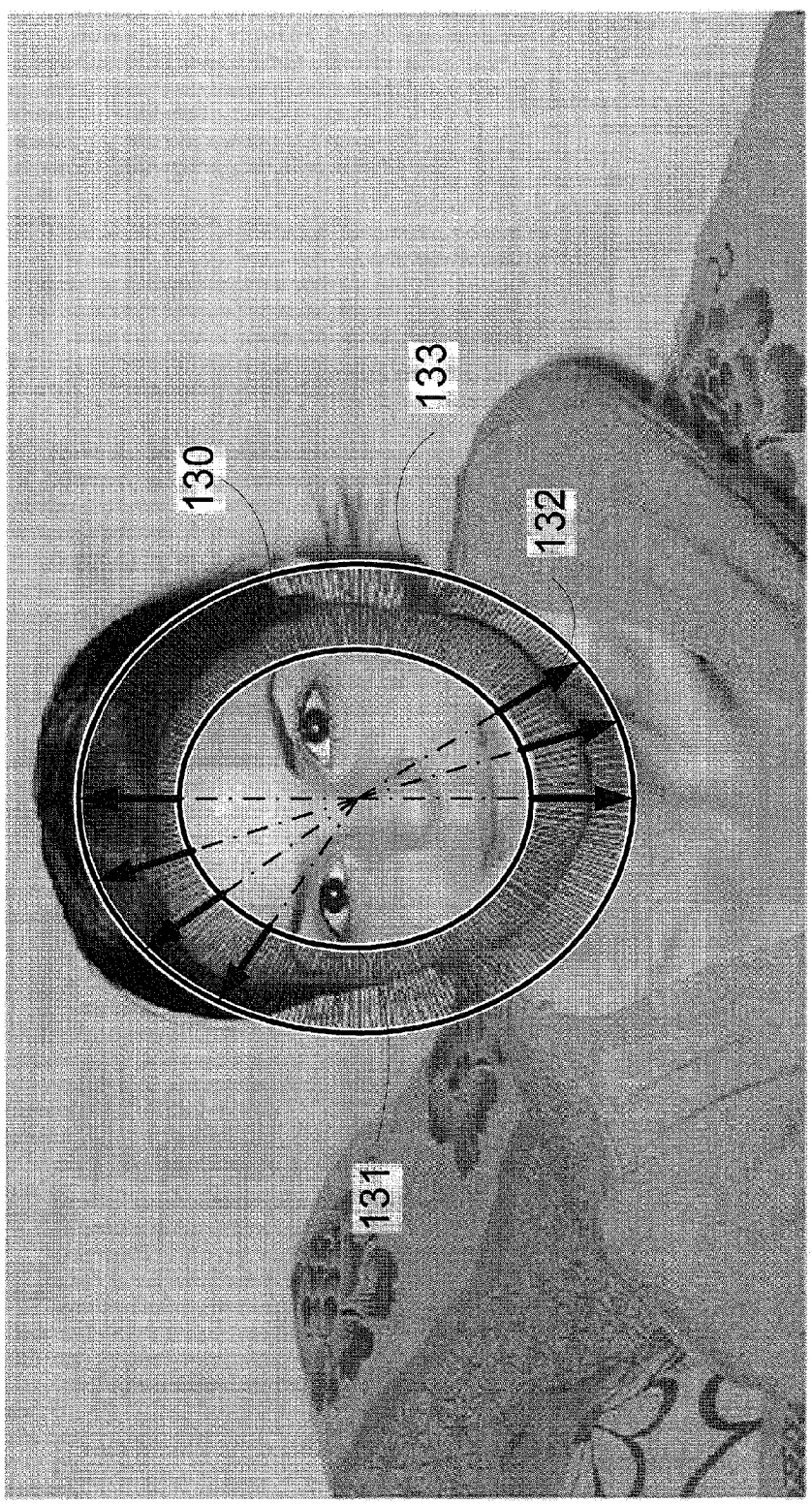
FIG. 6 illustrates a first search area according to an embodiment of the invention.

Method 500 continues (or starts) with stage 520 of defining a first search area in response to a value of a metric parameter and to a location of an element of interest within the image. It is noted that the defining of the first search area is conveniently responsive to the detected central face area, and/or to the locations of face parts such as and especially mouth, nose, or eyes; however, this is not necessarily so. The first search area is usually an area of the image in which a contour of the face is expected to be found. Referring to FIG. 6, the first search area according to an embodiment of the invention is denoted 130. It is further noted that more than one metric parameter, and/or locations of more the one element of interest may be used.

It is noted that, according to an embodiment of the invention, parameters other than metric parameters may also be used for the defining of the first search area. For example, color related parameters (such as color diversity parameters) may also be used.

According to an embodiment of the invention, the defining of the first search area is preceded by stage 521 of determining the value of the metric parameter in response to locations of areas of stage 511, and possibly also of the central face area. It is noted that different metric parameters may be used in different embodiments of the invention. By way of example, metric parameters that may be implemented are distance between the eyes, distance between the eyes and the mouth, and so forth. The location of the element of interest may be a location of a face part (e.g. center of an eye, corner of mouth, chin, and so forth), and may also be a location of a digitally created area, which is usually more arbitrary in nature (e.g. the center of the central face area may not necessarily correspond to a center of the face). It is noted that the value of the metric parameter may be determined in other ways, and so may also be the location of the element of interest.

It is further noted that the locations of elements of interest may be included within the first search area, but this is not necessarily so.

By way of example, according to an embodiment of the invention, the first search area is defined by two ellipses, the center of which is determined in response to a locations of the eyes—$eye_R X$, $eye_R Y$ $eye_L X$ $eye_L Y$ (wherein the coordinates of the eyes are, for example, centers of the eyes areas), so that the center of the two ellipses is located at $(X_0, Y_0)$, wherein, if $dX=0.72*(eye_R X - eye_L X)$ than $X_0 = eye_L X + 0.5*dX;$ $Y_0 = eye_L Y + 0.5*(eye_R Y - eye_L Y) + 0.5*dX.$ Continuing the same example, the axes of the outer ellipse are $a_{outer}=2.4*dX$ and $b_{outer}=2.8*dX$, and those of the inner ellipse are half of the corresponding axes of the outer ellipse–$a_{inner}=1.2*dX$ and $b_{inner}=1.4*dX$. It is again noted that other sizes of ellipses, non-concentrical ellipses, and search area borders of different shapes may be used.

It is noted that, according to an embodiment of the invention, the defining of the first search area is preceded by: (a) determining locations of multiple elements of interest wherein the multiple locations include locations of a mouth of the person, of a left eye of the person, and of a right eye of the person; and by (b) determining the value of the metric parameter in response to at least two locations out of the locations of the multiple elements of interest.

It is further noted that according to different embodiments of the invention, different shapes of the first search area may be implemented (and furthermore, according to an embodiment of the invention, the defining of the first search area may be preceded by selecting a shape of the first search area out of different shapes or selecting an algorithm out of different shape generating algorithms, e.g. depending on the values of the metric parameters, on the location of the element of interest or on values of other parameters, e.g. color related). For example, the first search area may be a rectangle, an ellipse, or any other closed shape.

According to an embodiment of the invention, the defining of the first search area includes defining a punctured search area (e.g. as exemplified in FIG. 6) that is defined by an external boundary and by an internal boundary. By way of illustration, search area 130 is bounded between an external ellipse 131 and by an internal ellipse 133. According to an embodiment of the invention, the external boundary and the internal boundary are ellipses, which may and may not have a common center. It is noted that the punctured search area may have more than one hole (e.g. due to color considerations).

It is noted that conveniently, the first search area can be defined such as to exclude the nose and the eyes (and possibly also of the mouth). This may be useful, by way of example, because the contour of the face is not expected to be in such locations.

It is noted that several first search areas may be defined (either concurrently or consecutively), e.g. larger areas may be used for course determination while smaller ones for refining, and so forth.

Stage 520 is followed by stage 530 of generating an edge detection data structure, wherein some of the elements of the edge detection data structure are indicative of edges of the image that are located within an edge detection search area that is contained within the first search area. According to an embodiment of the invention, the edge detection data structure is an edge detection matrix (or even a tensor of a higher rank), but this is not necessarily so.

It is noted that in stating that the edge detection search area is contained within the first search area it is meant that the edge detection search area may be the first search area, or a smaller area, depending on the embodiment of the invention. It is noted that the edge detection data structure may be saved and/or presented as an edge detection image (e.g. wherein each pixel of the edge detection image corresponds to a data structure element), but this is not necessarily so.

For example, areas that may be removed from the first search to provide the edge detection data structures, according to several embodiments of the invention, are the eyes areas, the mouth area, areas with colors similar to the face colors as determined before, and so forth. However, it is noted that in some embodiments of the invention it may be more efficient to generate the edge detection data structure for the entire first search area, and removing (or not) those areas at later stages.

FIG. 8A illustrates edge detection data structure 150, according to an embodiment of the invention. It is noted that the content of the edge detection data structure can be processed while using one or more algorithms for edge detection. It is noted that a correct algorithm may be selected according to one or more image parameters. The following sub stages of stage 520, which are carried out before the actual generation of the edge detection data structure, disclose one way of generating the edge detection data structure.

According to an embodiment of the invention, the generating of the edge detection data structure is preceded by stage 531 of generating an intensity data structure, wherein each column of the intensity data structure (or like subset thereof) includes color information representative of a one-dimensional section of the edge detection search area; wherein the edge detection data structure is generated by processing the intensity data structure for providing the edge detection data structure.

FIG. 8A illustrates intensity data structure 140, according to an embodiment of the invention. It is noted that the intensity data structure may be saved and/or presented as an intensity image (e.g. wherein each pixel of the intensity image corresponds to a data structure element), but this is not necessarily so.

Referring to FIG. 6, some of the one dimensional sections, according to an embodiment of the invention, are represented by the arrows 132. It is noted that the one directional sections may be taken in different ways, in different embodiments of the invention. The way the one-dimensional sections are taken is usually depending on the algorithm used for determining the contour path in stage 540, but this is not necessarily so. For example, according to different embodiments of the invention, the one-dimensional sections may be all parallel to each other, may have a single origin, may be perpendicular to a boundary of the first search area, and so forth.

According to an embodiment of the invention, the generating of the intensity data structure includes generating the intensity data structure, wherein all the one-dimensional sections pass through substantially a single point. According to an embodiment of the invention, the generating of the intensity data structure includes generating the intensity data structure, wherein all the one-dimensional sections are substantially perpendicular to a perimeter (or an external or internal boundary) of the edge detection search area.

It is noted that each element of the intensity data structure may correspond to one or more pixels of the edge detection search area, but more complex relations may be implemented as well. Conveniently, each element of the intensity data structure includes an intensity value that corresponds to an average of several pixels in the vicinity of a point on the corresponding one dimensional section. The intensity values may correspond to a color image, and may correspond to a gray scale version thereof. It is noted that the data structure may be a two-dimensional data structure, but may also be a data structure of a higher dimension (e.g. including several color values for each pixel).

It is noted that, according to an embodiment of the invention, the intensity data structure may be regarded (for illustrative needs, in order to clarify an aspect of the invention) as wrapping and/or stretching the edge detection search area to a rectangular image, on which columns computational operations can be easily made.

According to an embodiment of the invention, the generating of the intensity data structure includes generating the intensity data structure wherein elements of the intensity data structure are responsive to gray-level intensity values of the image.

According to an embodiment of the invention, the generating of the intensity data structure is followed by stage 532 of applying noise reduction to the intensity data structure (e.g. applying smoothing algorithms), to improve the generation of the edge detection data structure. It is further noted that smoothing algorithms (or other image processing algorithms) may also be used in other stages of the method, for improving results. For example, the image or parts thereof may be smoothed before the intensity data structure is being generated.

According to an embodiment of the invention, method 500 further includes state 533 of determining, for each of the columns of the intensity data structure, a data structure element that corresponds to a maximal absolute value of derivatives of color values along the one-dimensional section. It is noted that the intensity data structure may be implemented as an intensity matrix (or even as a tensor of a higher rank) which has multiple rows and columns, but other subsets rather than columns may be used for other types of intensity data structures.

It is noted that conveniently, when deriving each of the columns (e.g. wherein the derivation of each $n_{th}$ element is equal to $I_{n+1}-I_n$, wherein $I_n$ is the intensity value of the data structure element), each derived element is indicative of a rate of change over the one dimensional section. It is noted that conveniently, each one dimensional section is supposed to cross the contour of the face exactly once (e.g. as illustrated in FIG. 6). The derivations over the edge of the face (the contour) may be positive or negative (depending if the face is darker or brighter than its surrounding), and therefore the absolute values of the derivatives are conveniently used.

It is noted that according to an embodiment of the invention, local maximums are also taken, and not only the absolute maximum for each column is taken, so that the correct edge will be recognized in higher probability.

It is noted that the edge detection data structure may be a data structure that includes only binary values (which may be represented as a black/white image), in which a true value ("1") may indicate that an edge was found to an image location that corresponds to that data structure element, and a false value ("0") may indicate that no such edge was found. However, it is noted that in other embodiments of the invention, the edge detection data structure elements may include non-binary values (e.g. probabilities, or "gray scale" tones).

The edge detection data structure 150 of FIG. 8A was generated from the intensity data structure 140 according to the stages 531 and 533. It could be seen that in some of the columns of edge detection data structure 150 more than one edge have been determined. Also, not in all the columns an edge may be detected at all.

The edge detection data structure therefore has to be processed in order to determine the contour of the face.

Figure 8B:
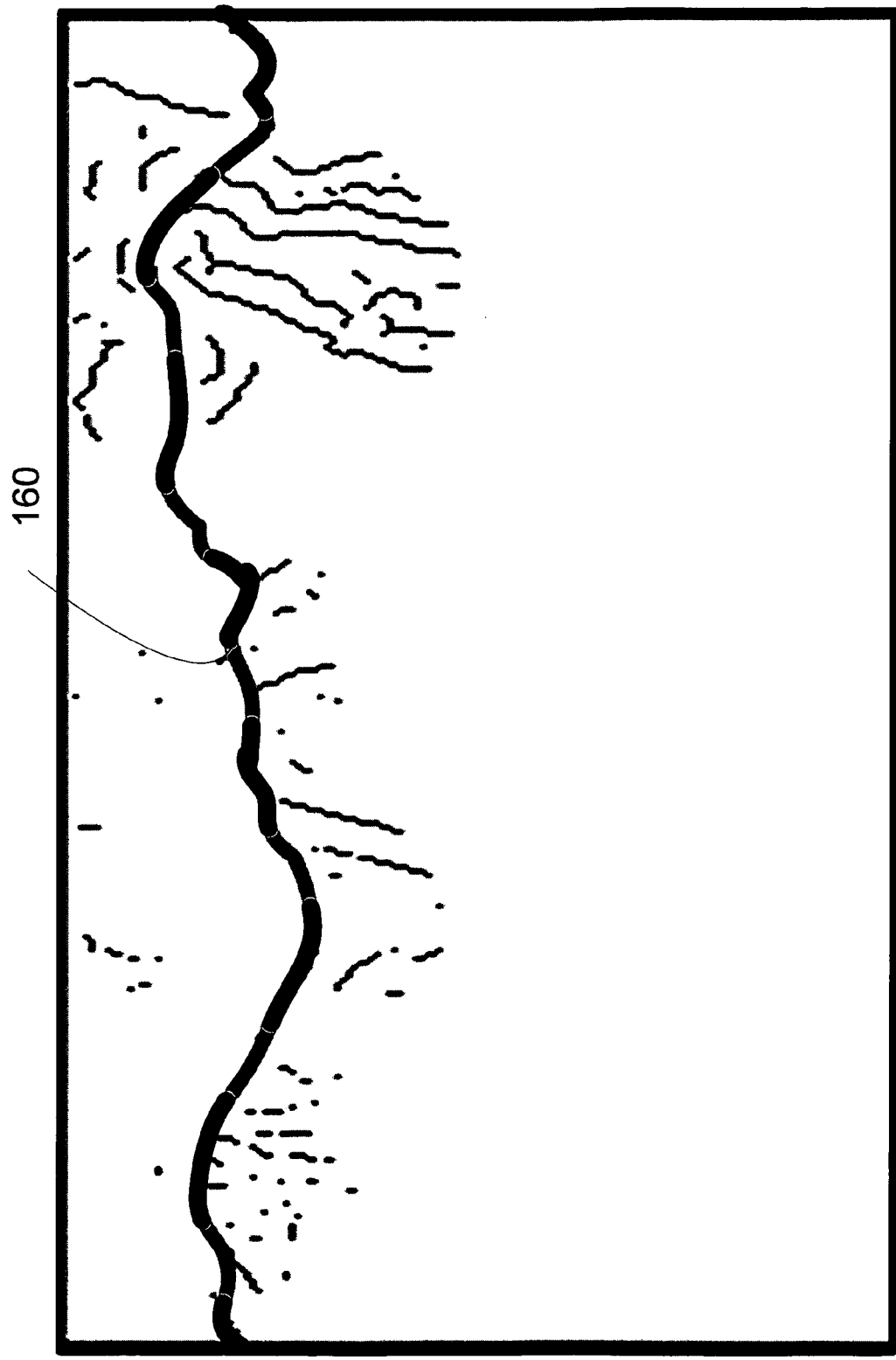

Method 500 continues with stage 540 of determining a contour path in the edge detection data structure in response to multiple edges of the edge detection data structure. It is noted that conveniently, the contour path includes a single data structure element from each column of the data structure; however, other implementations may be used as well. Referring to FIG. 8B, FIG. 8B illustrates the edge detection data structure 150 shown in FIG. 8A, according to an embodiment of the invention, on which the contour path 160 that was determined according to an embodiment of the invention is illustrated. It is noted that the contour path may be regarded, according to an embodiment of the invention, as an outline of the face of the person, when transformed in a transformation similar to the transformation of the image to the intensity data structure.

As could be seen in FIG. 8B, by way of example, the contour path is usually selected between several edges of the edge detection data structure, where several paths could have theoretically been chosen. Also, in some occasions the contour path may be determined over a "gap", in which no edge was detected in the edge detection data structure.

It is noted that conveniently, the determining of the contour path is carried out sequentially, starting from a single column (e.g. the first column of the edge detection data structure, a column for which the edge location is known in high probability, and so forth), and working out the contour path column by column. However, this is not necessarily so. Also, when such a process is implemented, it is noted that according to an embodiment of the invention, the determining may include a decision that a path that was tried did not turn out successful, and going back to a previous decision point, going in another direction.

According to an embodiment of the invention, stage 540 includes stage 541 of consecutively selecting a contour path element in a column of the edge detection data structure in response to a contour path segment that was determined for previous columns of the edge detection data structure. According to an embodiment of the invention, stage 541 starts from a column that corresponds to an expected temple location (or other face area in which the edge is expected to be clear).

It is noted that as aforementioned, the edge detection search area may be selected to include areas in which a contour of the face is not expected to be found. Therefore, according to different embodiments of the invention, different areas are removed from the edge detection data structure before making the determination.

By way of example, such removal may be carried out by zeroing the data structure elements that corresponds to such areas, or by replacing the data structure element value with a value that indicates that the area is to be ignored (e.g. "−1").

According to an embodiment of the invention, the determining of the contour path is preceded by masking the edge detection data structure for removing areas that are included in a central face area that includes locations of the mouth, the nose, and the eyes of the person (denoted as stage 542).

According to an embodiment of the invention, the determining of the contour path is preceded by stage 543 of masking the edge detection data structure for removing areas that correspond to areas of the image that have a color which is within a color range that is responsive to colors of a central face area.

It is noted that, according to an embodiment of the invention, several iterations are found, in which a first contour path (which is usually determined in courser resolution) is used for determining a search area for another iterations of stages 520, 530 and 540.

Once the contour path has been determined in the edge detection data structure, it can be easily used for determining the contour of the face in the original image.

Stage 540 is conveniently followed by stage 550 of retrieving a face portion of the image, wherein the face portion is included within a mask that is responsive to the contour path.

Figure 8C:
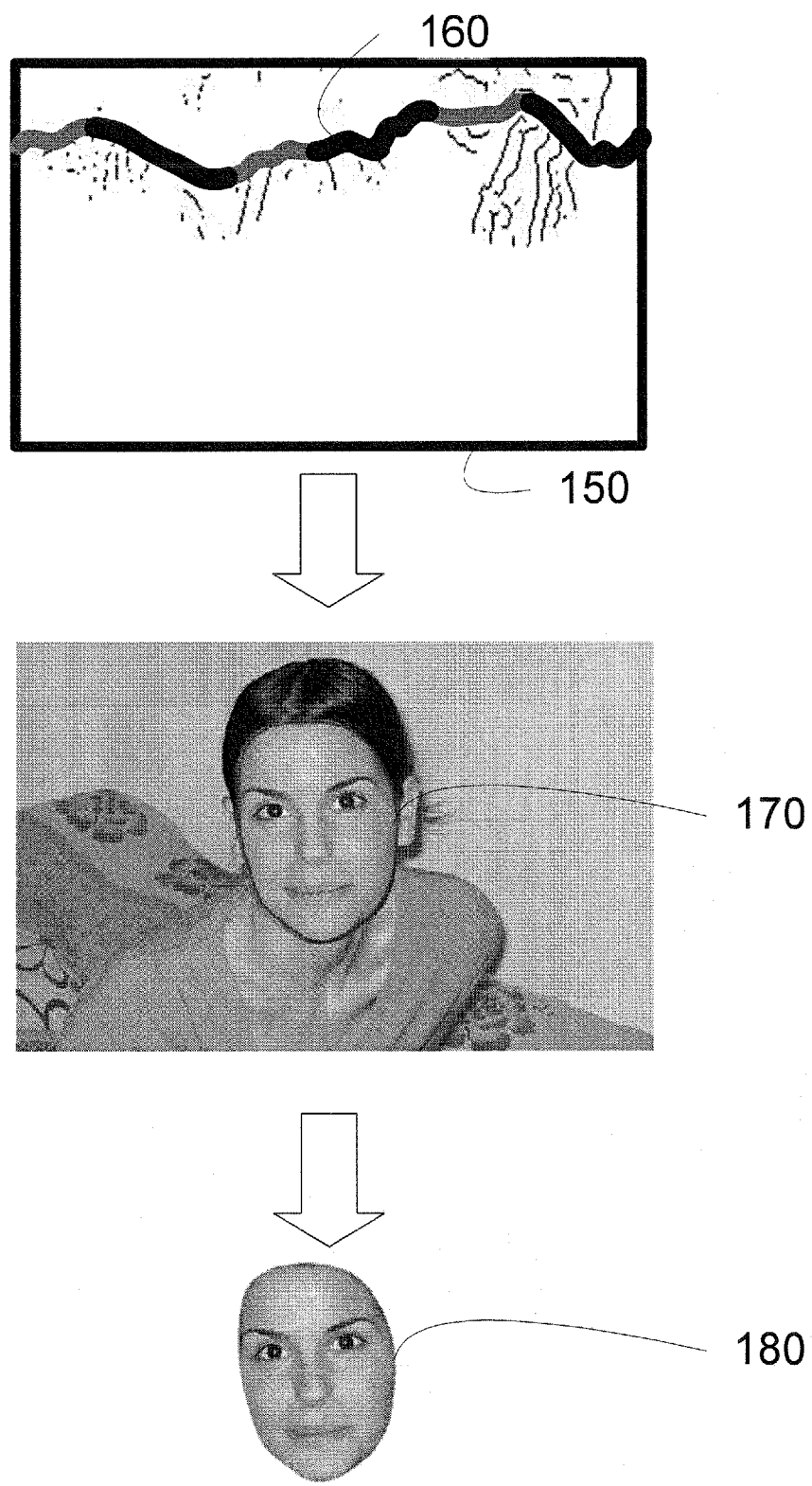
FIG. 8C illustrates an extraction of a face portion, according to an embodiment of the invention.

Referring to FIG. 8C, which illustrates the extraction of the face portion, according to an embodiment of the invention, the mask 170 is responsive to contour path 160, and the face portion extracted is denoted 180. It is noted that the face portion is not necessarily retrieved, and that, according to an embodiment of the invention, the contour path, and/or the mask is provided to another system/application that may utilize this information.

According to an embodiment of the invention, stage 550 is followed by stage 560 of transforming the face portion to fit a target space that is included in a target image, and incorporating the face portion into the target space, to provide a modified target image. It is noted that the transforming may be implemented in different ways, such as (though not limited to) transformations of shape, colors, filtering (e.g. sharpening), etc.

According to an embodiment of the invention, method 500 further includes stage 5100 of creating a physical artifact that is responsive to the face portion. For example, the face portion may be printed on a T-shirt or a mug. The face portion may be used for creating of a mask of the person, by molding a mask that is responsive to the face portion (and especially, according to an embodiment of the invention, to the contour of the face portion). It is noted that the physical article may be responsive to the modified target image (e.g. having a printing of which), which is in turn responsive to the face portion.

For example, according to several embodiments of the invention method 500 can be used in many applications, for instance, to create cartoons drawings, greeting cards, instant messaging, comic-book creation, computer games, animated films etc. Several of the uses for which method 500 may be used are:
  i. Virtual worlds;
  ii. Social networking;
  iii. Instant messaging;
  iv. Online Gaming;
  v. Avatars;
  vi. Greeting cards;
  vii. Photo Albums; and
  viii. Printed items.

Figure 9:
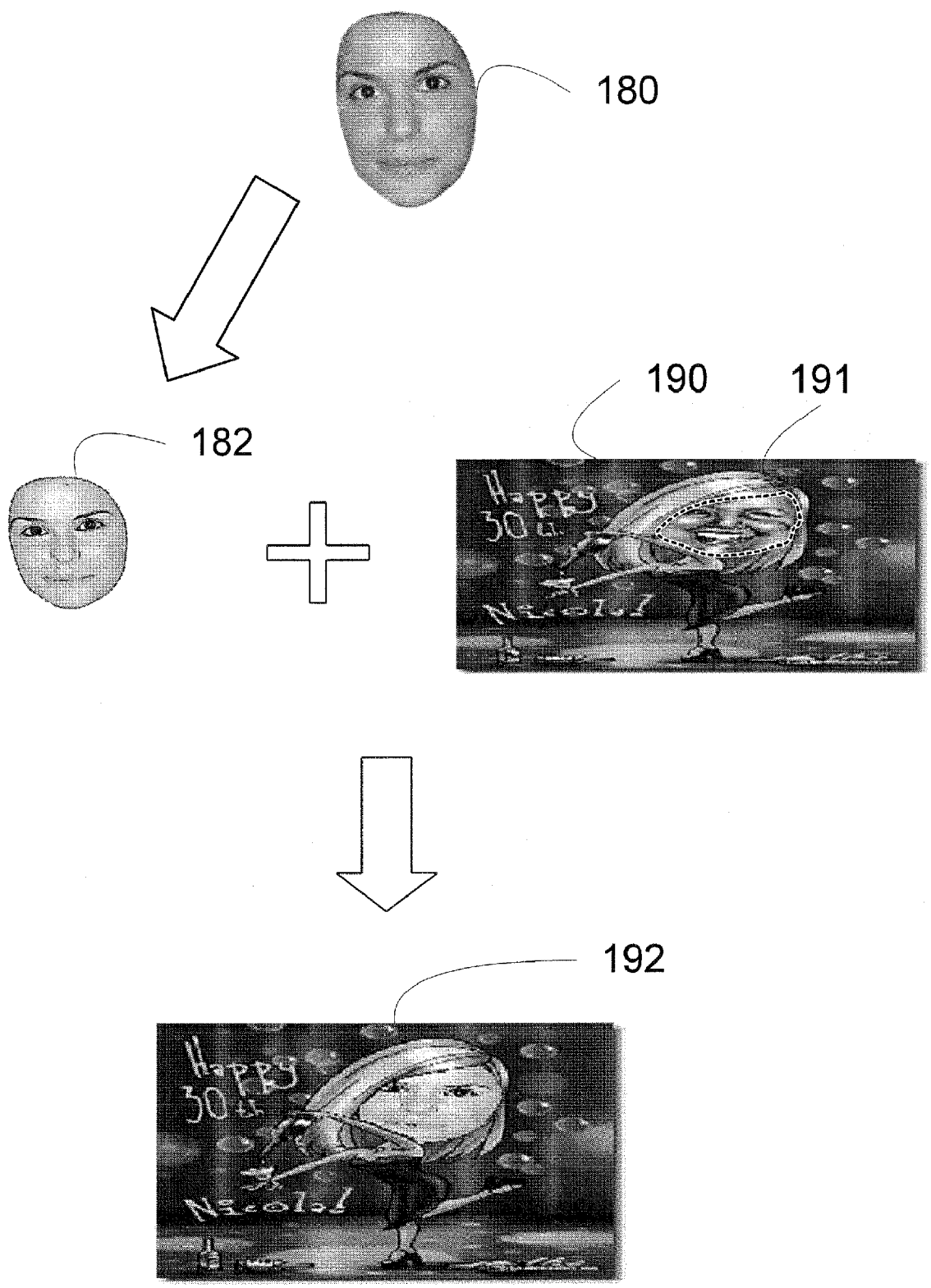
FIG. 9 illustrates an incorporation of a face portion into a cartoon, according to an embodiment of the invention.
Figure 11A:
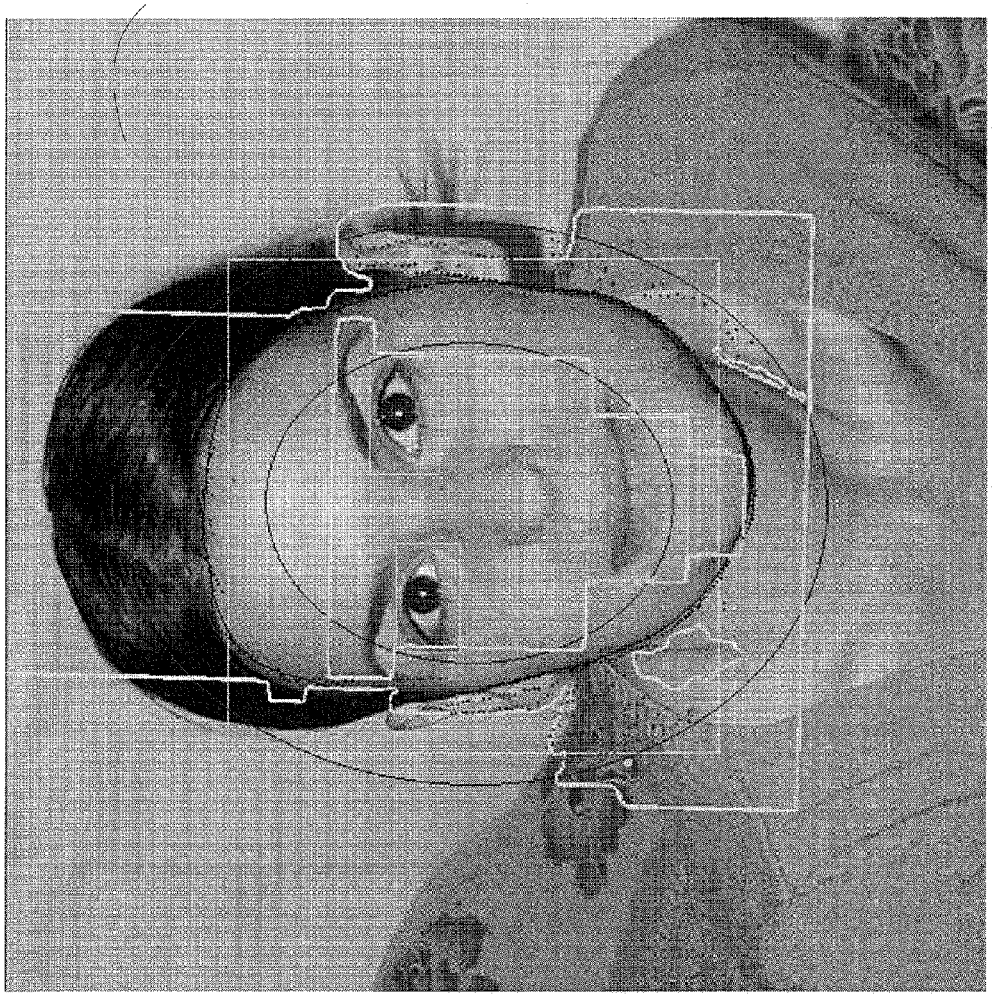
FIGS. 11A, 11B, 11C, and 11D illustrate an image and diverse generated information generated according to several embodiments of the invention.
Figure 11B:
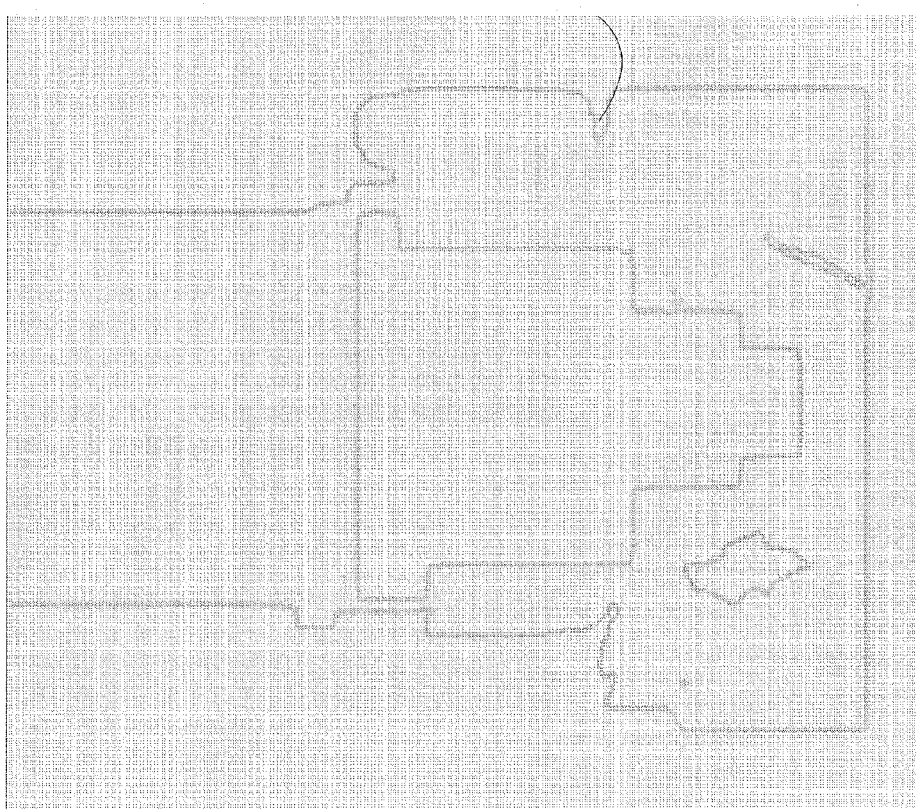
Figure 11C:
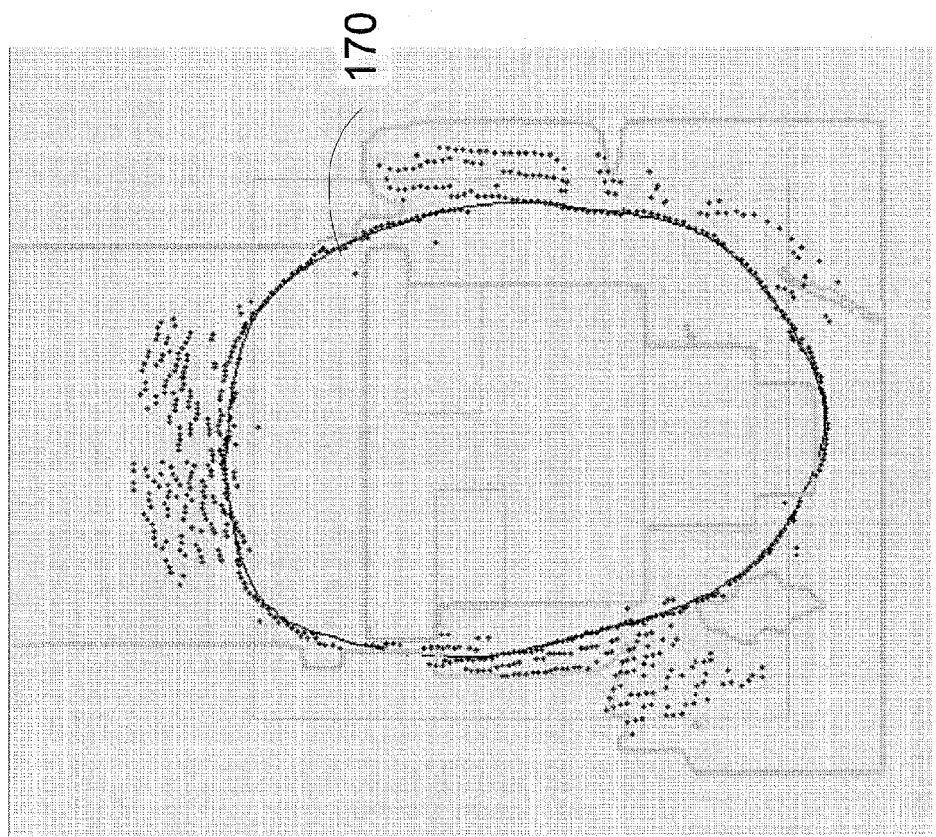
Figure 11D:
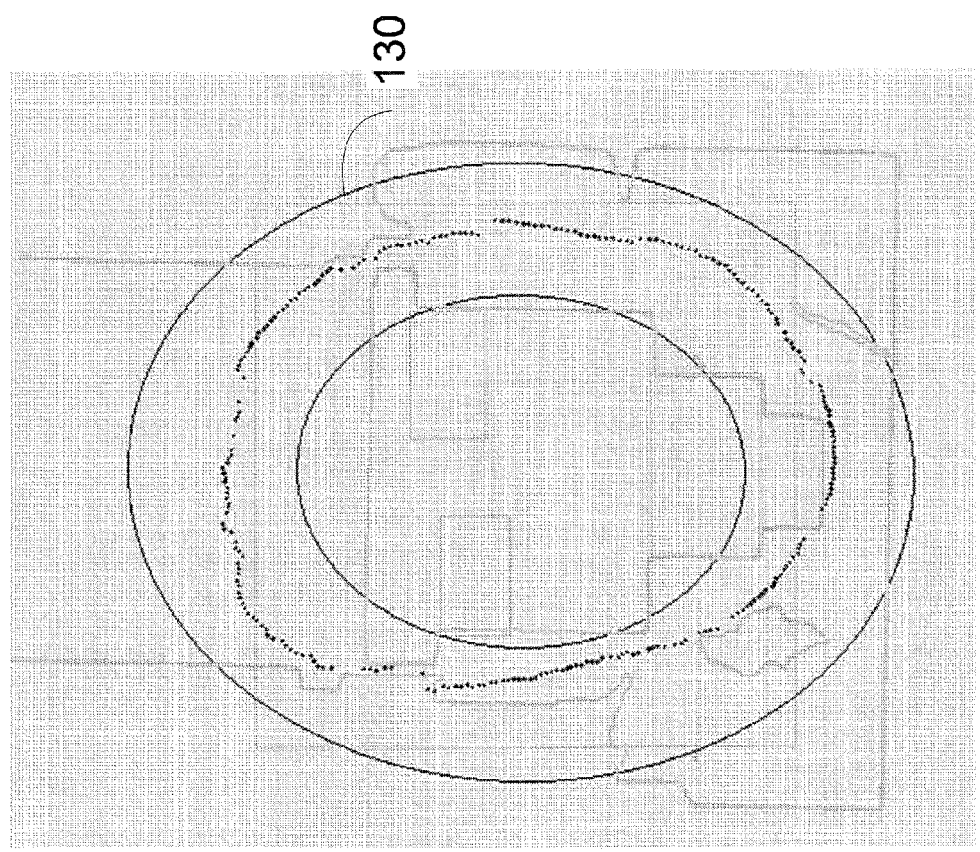

According to an embodiment of the invention, the face portion may be incorporated into another image, with or without additional processing. By way of an example, FIG. 9 illustrates incorporation of the face portion 180 into a cartoon 190, for providing image 192 that is responsive to the face portion, wherein the face portion 180 is previously processed into cartoonized.

It is noted that conveniently, method 500 does not require user intervention, nor user input other than potentially the digital image and/or selection of a face out of multiple faces in the image, for carrying out the process.

Figure 3:
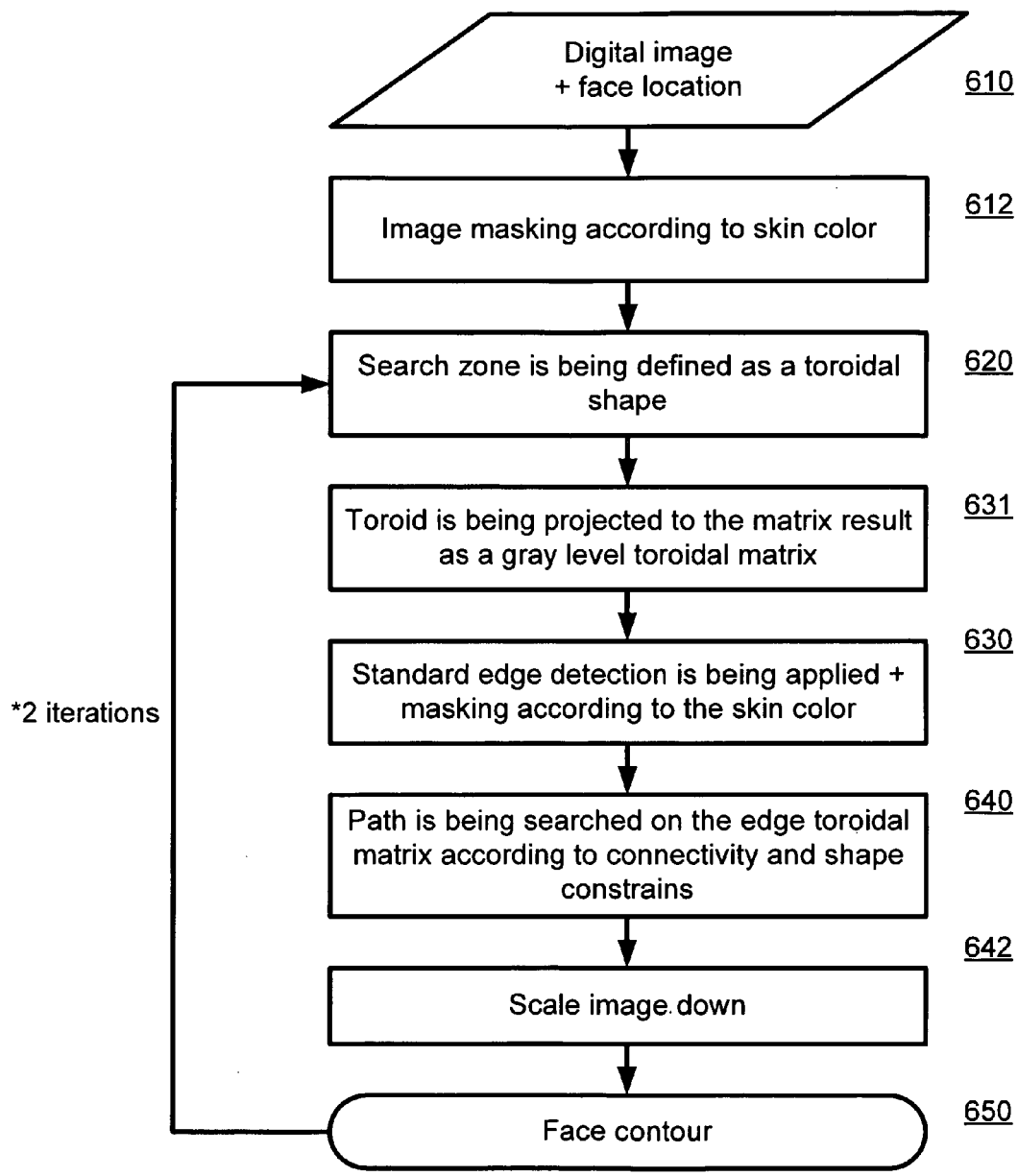

FIG. 3 illustrates method 600 for processing an image, according to an embodiment of the invention. It is noted that, according to an embodiment of the invention, method 600 may be carried out by system 200. It is further noted that methods 500 and 600 may be related to each other, and that stages of method 500 may be used in method 600 (in addition or instead of specific stages of method 600), and vise versa. It is noted that according to an embodiment of the invention, stage 610 corresponds to stage 510 of method 500, stage 620 corresponds to stage 520 of method 500, and so forth. Also, the terms that are used for the disclosure of method 600 may be replaced, according to an embodiment of the invention, with the corresponding terms of method 500, and vise versa.

According to an embodiment of the invention, method 600 starts with stage 610 of determining a location of the face (and/or central face area) within the image (which is a digital image). According to a disclosed scenario, a user will upload a digital photo of interest, which will be manipulated to turn the image into a cartoon image, or into another product or output. For instance, a user may want to insert a headshot of a friend, onto a cartoon body shown in a particular backdrop. Referring to FIG. 5, software, hardware, and/or firmware modules may be used to perform face detection upon the digital photo, e.g. by searching for eyes and a mouth. Optionally, the cheekbones and/or nose can be detected as well.

It is conveniently desired to find contour of the face, namely the borders of the face without the hair, neck, or ears, in order to "cut" the face of interest from the digital photo and insert it onto the target cartoon body. Face contour detection, also termed "face segmentation", is especially problematic for image analysis products, for many reasons: the neck usually has the same coloring as the face and so the image analysis product will have difficulty determining where the face ends and the neck begins. The hairline may have the same coloring as the background of the photo, therefore the image analysis product will have difficulty detecting where the hairline begins. The face may not be in full frontal position, so that the features (eyes, nose, mouth) may not be centered or may appear distorted. Shadows will often be present in the photo, which hamper border detection. Shirt collars or jewelry may interfere with the process.

According to an embodiment of the invention, method 600 further includes stage 612 of generating a mask according to skin color, which may include determining at least one color parameter by processing colors of the central face area. The determining of the mask may be followed by masking the image to remove non-faced-color area from areas that are processed to find the contour of the face, but this is not necessarily so. FIG. 7 illustrates masking of image 100, according to an embodiment of the invention, to provide masked image 142, onto which image processing may be applied.

Method 600 continues with stage 620 of defining the first search area, possibly defined as a toroidal or semi-toroidal shape.

Stage 620 is followed by stage 630 of generating the edge detection data structure by applying standard edge detection to an intensity data structure that is generated in stage 631 (and which may be, according to an embodiment of the invention, a gray level toroidal data structure). According to an embodiment of the invention, the edge detection data structure is masked according to the color parameter relating to the determined skin color.

Stage 630 is followed by stage 640 searching for a contour path in the edge detection data structure according to parameters such as connectivity and shape constrains of multiple edges of the edge detection data structure.

According to an embodiment of the invention, stage 640 is followed by stage 642 of scaling down the image and reiterating stages 620 through 640 (or 642) for defining better matching contour paths, until a final contour path is determined. However, this reiteration is not necessarily carried out.

Method 600 continues with stage 650 determining the face contour and retrieving a portion of the image that is responsive to the face contour.

Figure 4:
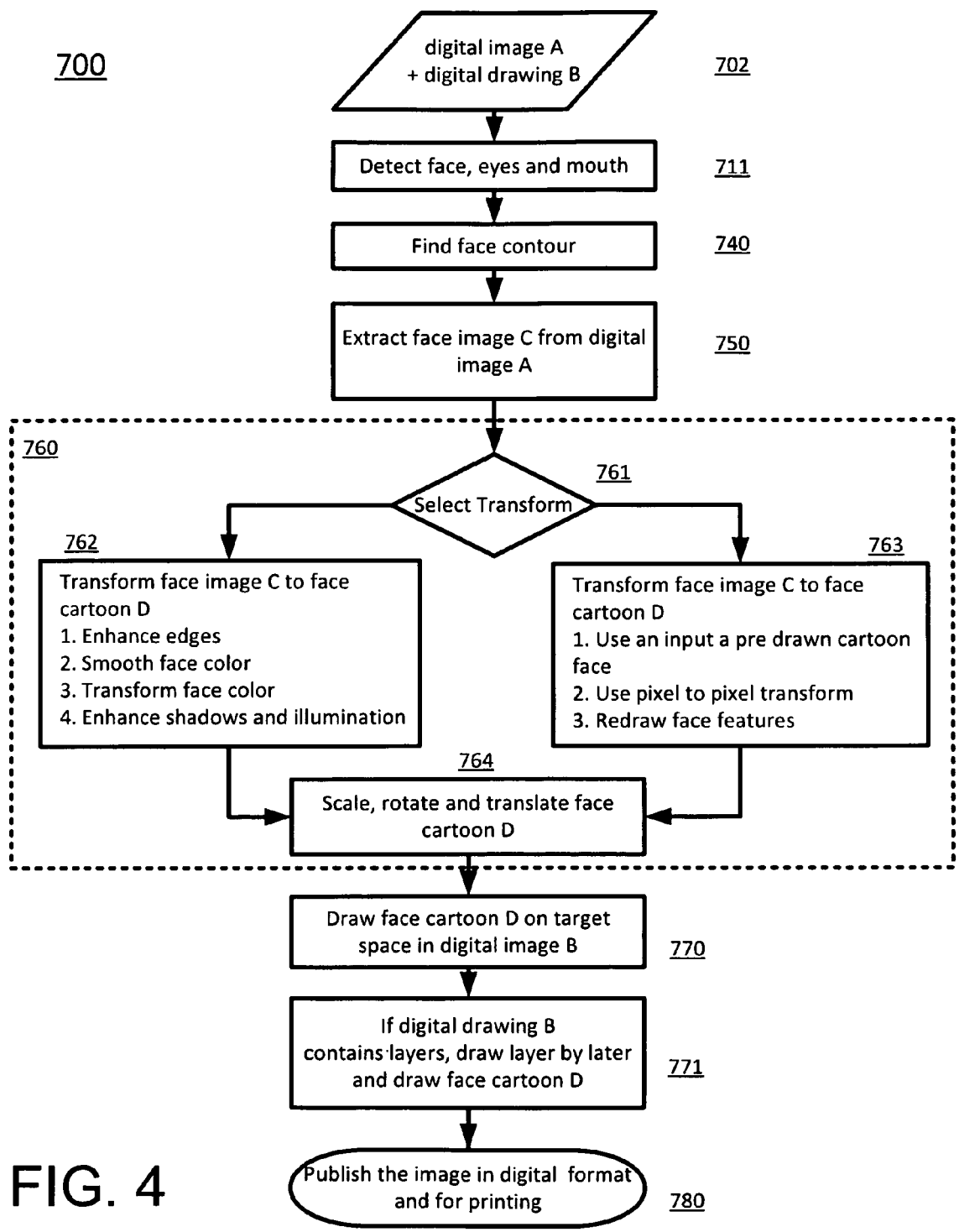

FIG. 4 illustrates method 700 for processing an image, according to an embodiment of the invention. It is noted that, according to an embodiment of the invention, method 700 may be carried out by system 200. It is further noted that methods 500, 600, and 700 may be related to each other, and that stages of methods 500 and 600 may be used in method 700 (in addition or instead of specific stages of method 700), and vise versa. It is noted that according to an embodiment of the invention, stage 710 corresponds to stage 510 of method 500, stage 720 corresponds to stage 520 of method 500, and so forth. Also, the terms that are used for the disclosure of method 700 may be replaced, according to an embodiment of the invention, with the corresponding terms of method 500, and vise versa.

According to an embodiment of the invention, method 700 starts with stage 702 of receiving the image of the person (referred to as digital image A) and a target image or drawing (referred to as digital drawing B). It is noted that alternatively, one or both of the graphics may be otherwise acquired or generated. According to several embodiment of the invention, the digital image 100 may be in any format—may contain face or several faces. According to different embodiments of the invention, the target image 190 may contain target space 191 for face with or without several layers. It is noted that the target image may contain more than one target space (e.g. for inserting faces of a group of people). The term "layer" refers to a portion of image data treated and processed as a single block. For instance the head may be a single layer, with the hair, is a separate layer and the background is also processed as a separate layer.

Method 700 continues with stage 711 of detecting face areas such as central face area, eyes areas, mouth area, and also possibly cheekbones areas and nose areas. Method 700 continues with stage 740 of finding a face contour (e.g. as disclosed in methods 600 and 700, but other processes may be used as well). Stage 740 may be a result of a process that includes one or more stages of: (a) Image masking; (b) Search zone for face detection is defined as a toroidal shape, or an ellipse. This ellipse is calculated according to the center of the detected face and the eyes location. The center of the ellipse is calculated according to the center of the detection rectangle or the eyes location. The minor and major axes of the ellipse can be calculated according to the eyes distance. (c) projecting this toroidal shape to a linear data structure where each line in the data structure is the string in the toroid according to the polar coordinates; (d) the toroid is projected to the data structure result as a gray level toroid data structure; (e) Standard edge detection is applied to the toroid data structure, and then these edges are masked according to the skin color mask; (f) the path is searched on the edge toroid data structure according to connectivity and shape constrains. According to an embodiment of the invention, this algorithm works in multi scale method where steps are reiterated and the size of the search zone (toroid shape) is narrower for each reiteration.

Stage 740 is followed by stage 750 of extracting a face image or a face image portion (referred to as face image C) from the image.

Method 700 continues with one or more stages of transforming the face portion, collectively denoted 760. It is noted that the transforming stages 760 may be used for cartoonizing the face portion, but other modification may be used. According to an embodiment of the invention, the transformation 760 applied to the face portion matches (and possibly selected in response) to a type of the target image. For example, if the target drawing is a cartoon, the face portion may be cartoonized, if the target image is a black and white image, the face portion may be transformed to a B/W data, and so forth.

According to an embodiment of the invention, the transforming may start with selecting between two or more types of transformation (denoted 761), usually in response to the type of the target image, to metric parameters of the target image or of a target space within the target image (into which the face portion should be inserted), to the type or metric parameters of the source image, or to any combination thereof.

A first transformation process which may be used is denoted 762 and includes implementing one or more of the following processes: 1. Enhance edges on face features like mouth, eyes, face contour, cheekbones; 2. Smooth face color; 3. Transform face color (e.g. to nearest face color from digital image B pallet); and 4. Enhance shadows and illumination in face portion, e.g. according to original image or according to predefined rules.

A second transformation process that may be used is denoted 763 and includes implementing one or more of the following processes: 1. Use as an input a pre drawn cartoon face image with no features (eyes, mouth, etc) of an average face; 2. Use pixel to pixel transform, and/or multipoint to multipoint transform with face portion to redraw the image and receive a face cartoon that looks like the face portion; and 3. Redraw face features, e.g. with transformation similar to those of process 762.

According to an embodiment of the invention, the transforming includes stage 764 of transform the modified face portioned to fit into the target space, e.g. by one of the followings: (a) Similarity transformation—Scale, rotate and translate; (b) Affine transformation; (c) Image correspondence transformation—Each pixel in destination image is acquired from pixel or group of pixels in source image.

It is noted that according to an embodiment of the invention, method 700 may also include transforming the target image (e.g. by modifying the target space, colors of the target image (especially in vicinity of the target space) and so forth.

Method 700 continues with stage 770 of incorporating the face portion (or the transformed face portion) into the target image, e.g. by drawing the face cartoon on the target space in the target image. It is noted that stage 770 may be implemented by inserting the face portion in a layer by layer process (denoted 771).

According to an embodiment of the invention, method 700 continues with stage 780 of publish the image in digital format and for printing, or by otherwise creating a physical artifact that is responsive to the face portion (it is noted stage 5100 of method 500 may usually correspond to stage 780, and not to stage 760).

Referring to the stages 760 of transforming, and especially to transforming the face portion to a carton-like face portion (in a process referred to as cartoonizing), according to an embodiment of the invention, in order to give the face a more cartooned, less natural, appearance, the face coloring is processed, in an automatic manner which is performed instantaneously by the software, in a procedure termed "image masking". Masking, to smooth the coloring as with a median filter, is performed according to the skin color of the person captured in the digital image. The image is converted to HSV color format. In the preferred embodiment, the Hue component is lightened, the Saturation component is made more colorful and the Brightness component is intensified. The face color is detected from the central region present on the face. This region location and size is calculated according to the approximate eye and mouth locations. The values of pixels inside this region are collected and an estimation of the color range, in HSV space, is made, for this group of pixels. For example, the average color in HSV is the center of the group and the standard deviation in each HSV dimension can define the boundary. More precise methods can optionally be applied, such as utilization of Gaussian distribution. Optionally, the non-face colors can be used to accurately define the boundary of this group.

Like the rest of the method, it is noted that according to an embodiment of the invention, method 700 may be used for source video (instead of still image) and/or for target video (e.g. cartoon) instead of target image. This may be done of a frame by frame basis, or using inter-frame information.

FIG. 5 illustrates image 100, according to an embodiment of the invention, as well as central face area 110, as well as the left eye area that is represented by frame 122L, the right eye area that is represented by frame 122R, and the mouth area that is represented by frame 124, all of which according to a single embodiment of the invention.

FIG. 6 illustrates first search area 130 according to an embodiment of the invention. The first search area according to an embodiment of the invention is denoted 130. Some of the one dimensional sections, according to an embodiment of the invention, are represented by the arrows 132.

FIG. 7 illustrates masking of image 100, according to an embodiment of the invention, to provide masked image 142, onto which image processing may be applied.

FIG. 8A illustrates edge detection data structure 150, according to an embodiment of the invention.

FIG. 8B illustrates the edge detection data structure 150 shown in FIG. 8A, according to an embodiment of the invention.

FIG. 8C, which illustrates an extraction of a face portion, according to an embodiment of the invention.

FIG. 9 illustrates incorporation, according to an embodiment of the invention, of the face portion 180 into a cartoon 190, for providing image 192 that is responsive to the face portion, wherein the face portion 180 is previously processed into cartoonized.

FIG. 10 illustrates image 100 in two different scales (denoted 100A and 100B), wherein results of applying of steps of a method (500, 600 or 700) to one of the scales of the image are used for processing the otherwise scaled image 100.

FIGS. 11A, 11B, 11C, and 11D illustrate image 100, according to an embodiment of the invention, as well as diverse generated information generated according to several embodiments of the invention.

Color responsive mask 142 (which is illustrated for example in FIG. 11B) may be generated according to skin color, which may include determining at least one color parameter by processing colors of the central face area 110. The determining of the mask may be followed by masking the image to remove non-faced-color area from areas that are processed to find the contour of the face, but this is not necessarily so.

According to several embodiments of the invention, method 500, 600, and/or 700 may be used in standalone or in a web application, e.g. in the following process: (a) user uploads a face image to web server; (b) user selects a background image; (c) the method is applied on two images; and (d) the user is prompted for transformed image download (this step can be also contains payment).

According to several embodiments of the invention, method 500, 600, and/or 700 may be used as a service in several applications, e.g. by: (a) The service provider sends a face image and a background image to the server; (b) the method is applied on two images; and (c) a transformed image is sent to the service provider and the action is audited for payment purposes.

It is noted that any of the methods 700 may be used for other parts of the body beside the face (including garments such as identifying a trousers portion, for example), for identifying faces or other parts of animals, and for identifying other objects (e.g. locating a basketball in a frame).

Referring to the transformation of image 100 to a cartoon image, according to an embodiment of the invention, the present invention provides, according to an aspect thereof, a software tool useful for effortless conversion of a digital photo into a cartoon image. In contrast to prior art, where the user needs to repeatedly guide the imaging software on how to manipulate the image, in the present invention all steps are automatic, in a "one-click" manner. While in prior art, professional results can be obtained mainly by a professional draftsman, the present invention obtains professional results for any amateur or first-time user. The inventors have developed appropriate algorithms that allow the user to supply a digital photo in any digital format, and have it converted within seconds to a cartoon image. The resultant cartoon image is highly improved over those created by other image-manipulating software programs, which need to be "tweaked" repeatedly by a user.

Referring now back to system 200 (which is illustrated in FIG. 1), according to an embodiment of the invention, processor 220 is further adapted to determine, prior to the defining of the first search area, a central face area of the image and a location of the element of interest within the first area.

According to an embodiment of the invention, processor 220 is adapted to determine, prior to the defining of the first search area, (a) locations of multiple elements of interest wherein the multiple locations include locations of a mouth of the person, of a left eye of the person, and of a right eye of the person; and (b) the value of the metric parameter in response to at least two locations of elements of interest.

According to an embodiment of the invention, processor 220 is further adapted to define a first search area that is a punctured search area that is defined by an external boundary and by an internal boundary.

According to an embodiment of the invention, processor 220 is further adapted to define the first search area that excludes from the outside locations of the nose and the eyes.

According to an embodiment of the invention, the external boundary and the internal boundary are ellipses (which may, according to an embodiment of the invention, have a common center).

According to an embodiment of the invention, processor 220 is further adapted to generate an intensity data structure, prior to the generating the edge detection data structure, wherein each column of the intensity data structure includes color information representative of a one-dimensional section of the edge detection search area; and to process the intensity data structure for providing the edge detection data structure. According to an embodiment of the invention, all the one-dimensional sections pass through substantially a single point. According to an embodiment of the invention, all the one-dimensional sections are substantially perpendicular to a perimeter of the edge detection search area. According to an embodiment of the invention, elements of the intensity data structure are responsive to gray-level intensity values of the image.

According to an embodiment of the invention, processor 220 is further adapted to determine, for each of the columns of the intensity data structure, a data structure element that corresponds to a maximal absolute value of derivatives of color values along the one-dimensional section.

According to an embodiment of the invention, processor 220 is further configured to consecutively select a contour path element in a column of the edge detection data structure in response to a contour path segment that was determined for previous columns of the edge detection data structure, for determining of the contour path.

According to an embodiment of the invention, processor 220 is further adapted to mask the edge detection data structure for removing areas that are included in a central face area that includes locations of the mouth, the nose, and the eyes of the person, prior to determining of the contour path.

According to an embodiment of the invention, processor 220 is further adapted to mask the edge detection data structure for removing areas that correspond to areas of the image that have a color which is within a color range that is responsive to colors of a central face area, prior to the determining of the contour path.

According to an embodiment of the invention, system 200 further includes at least one moving part that participates in a creation of a physical artifact that is responsive to the face portion. Such moving part may, for example, be a part of a printer 250 of system 200, of a 3D printer, of a material cutting module, and so forth.

According to an embodiment of the invention, processor 220 is further adapted to transform the face portion to fit a target space that is included in a target image, and to incorporate the face portion into the target space, to provide a modified target image.

According to an aspect of the invention, computer readable medium having a computer readable code for processing images is disclosed. The computer readable code including instructions (executable by a processor and/or other components, e.g. of system 200) for: (a) defining a first search area in response to a value of a metric parameter and to a location of an element of interest within the image; (b) generating an edge detection data structure, wherein some of the elements of the edge detection data structure are indicative of edges of the image which are located within an edge detection search area that is contained within the first search area; (c) determining a contour path in the edge detection data structure in response to multiple edges of the edge detection data structure, wherein the contour path includes a single data structure element from each column of the data structure; and (d) retrieving a face portion of the image, wherein the face portion is included within a mask that is responsive to the contour path.

According to an embodiment of the invention, the computer readable code further includes instructions for detecting a central face area of the image and a location of the element of interest within the first area, before the defining of the first search area.

According to an embodiment of the invention, the computer readable code further includes instructions for determining: (a) locations of multiple elements of interest wherein the multiple locations include locations of a mouth of the person, of a left eye of the person, and of a right eye of the person; and (b) the value of the metric parameter in response to at least two locations out of the multiple locations, prior to the defining of the first search area.

According to an embodiment of the invention, the computer readable code further includes instructions for defining a punctured search area that is defined by an external boundary and by an internal boundary.

According to an embodiment of the invention, the computer readable code further includes instructions for defining the first search area that excludes from the outside locations of the nose and the eyes.

According to an embodiment of the invention, the computer readable code further includes instructions for generating an intensity data structure, prior to the generating of the edge detection data structure, wherein each column of the intensity data structure includes color information representative of a one-dimensional section of the edge detection search area; and for processing the intensity data structure for providing the edge detection data structure.

According to an embodiment of the invention, the instructions for the generating of the intensity data structure include instructions for generating the intensity data structure, wherein all the one-dimensional sections pass through substantially a single point.

According to an embodiment of the invention, the instructions for the generating of the intensity data structure include instructions for generating the intensity data structure, wherein all the one-dimensional sections are substantially perpendicular to a perimeter of the edge detection search area.

According to an embodiment of the invention, the instructions for the generating of the intensity data structure include instructions for generating the intensity data structure wherein elements of the intensity data structure are responsive to gray-level intensity values of the image.

According to an embodiment of the invention, the computer readable code further includes instructions for determining, for each of the columns of the intensity data structure, a data structure element that corresponds to a maximal absolute value of derivatives of color values along the one-dimensional section.

According to an embodiment of the invention, the computer readable code further includes instructions for consecutively selecting a contour path element in a column of the edge detection data structure in response to a contour path segment that was determined for previous columns of the edge detection data structure.

According to an embodiment of the invention, the computer readable code further includes instructions for masking the edge detection data structure for removing areas that are included in a central face area that includes locations of the mouth, the nose, and the eyes of the person, prior to the determining of the contour path.

According to an embodiment of the invention, the computer readable code further includes instructions for masking the edge detection data structure for removing areas that correspond to areas of the image that have a color which is within a color range that is responsive to colors of a central face area, prior to the determining of the contour path.

According to an embodiment of the invention, the computer readable code further includes instructions for creating a physical artifact that is responsive to the face portion.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for processing an image of a person, the image of the person comprises an image of a face of the person, the method comprising:

defining a first search area in response to a value of a metric parameter and to a location of an element of interest within the image;

generating by a processor an edge detection data structure, wherein some of the elements of the edge detection data structure are indicative of edges of the image which are located within an edge detection search area that is contained within the first search area; wherein each column of the edge detection data structure comprises color information representative of a one-dimensional section of the edge detection search area; wherein each one-dimensional section of the edge detection search area is either perpendicular to a boundary of the first search area, have a same origin as other one-dimensional sections of the edge detection search area or crosses the contour of the image of the face of the person exactly once;

determining by the processor a contour path in the edge detection data structure in response to multiple edges of the edge detection data structure, wherein the contour path includes a single data structure element from each column of the edge detection data structure; and retrieving a face portion of the image, wherein the face portion is included within a mask that is responsive to the contour path.

2. The method according to claim 1, wherein the defining of the first search area is preceded by: (a) determining by the processor multiple locations of elements of interest wherein the multiple locations of the elements of interest comprise locations of a mouth of the person, of a left eye of the person, and of a right eye of the person; and by (b) determining the value of the metric parameter in response to at least two locations out of the multiple locations of the elements of interest.

3. The method according to claim 1, wherein the defining of the first search area comprises defining by the processor a punctured search area that is defined by an external boundary and by an internal boundary.

4. The method according to claim 3, wherein the defining of the first search area comprises defining by the processor an elliptical internal boundary and an elliptical external boundary; wherein an axes of the elliptical internal boundary are half a size of corresponding axes of the elliptical external boundary.

5. The method according to claim 1, wherein the generating of the edge detection data structure is preceded by generating by the processor an intensity data structure, wherein each column of the intensity data structure comprises color information representative of a one-dimensional section of the edge detection search area; and by processing the intensity data structure for providing the edge detection data structure.

6. The method according to claim 5, further comprising determining by the processor, for each of the columns of the intensity data structure, a data structure element that corresponds to a maximal absolute value of derivatives of color values along the one-dimensional section.

7. The method according to claim 3 wherein the defining of the first search area comprises defining by the processor an elliptical internal boundary and an elliptical external boundary; wherein a center of the elliptical internal boundary and of the elliptical external boundary is located at coordinates (X0, Y0); wherein X0=eyeLx +0.5*dX ; Y0=eyeLy +0.5*(eyeRy−eyeLy)+0.5*dX; wherein eyeLx is an x-axis coordinate of a left eye of the person, eyeRx is an x-axis coordinate of a right eye of the person, eyeLy is an y-axis coordinate of the left eye of the person, eyeRy is an y-axis coordinate of the right eye of the person, and dX=0.72*(eyeRx−eyeLx).

8. The method according to claim 1, wherein each one-dimensional section of the edge detection search area is perpendicular to the boundary of the first search area and crosses the contour of the image of the face of the person exactly once.

9. The method according to claim 1, wherein the determining of the contour path is preceded by masking by the processor the edge detection data structure for removing areas that correspond to areas of the image that have a color which is within a color range that is responsive to colors of a central face area.

10. The method according to claim 1, wherein the retrieving of the face portion is followed by creating by the processor a physical artifact that is responsive to the face portion.

11. The method according to claim 1, further comprising transforming by the processor the face portion to fit a target space that is included in a target image, and incorporating the face portion into the target space, to provide a modified target image; wherein the transforming is preceded by generating a Hue, Saturation and Brightness (HSV) image of the person; lightening a Hue component of the HSV image of the person; making a Saturation component of the HSV image of the person more colorful and intensifying a Brightness component of the HSV image of the person.

12. A system for processing an image of a person, the system comprising:

a network interface, configured for reception of the image; and a processor, adapted to: (a) define a first search area in response to a value of a metric parameter and to a location of an element of interest within the image; (b) generate an edge detection data structure, wherein some of the elements of the edge detection data structure are indicative of edges of the image which are located within an edge detection search area that is contained within the first search area; (c) determine a contour path in the edge detection data structure in response to multiple edges of the edge detection data structure, wherein the contour path includes a single data structure element from each column of the data structure; and (d) retrieve a face portion of the image, wherein the face portion is included within a mask that is responsive to the contour path; wherein each column of the edge detection data structure comprises color information representative of a one-dimensional section of the edge detection search area wherein each one-dimensional section of the edge detection search area is either perpendicular to a boundary of the first search area, have a same origin as other one-dimensional sections of the edge detection search area or crosses the contour of the image of the face of the person exactly once.

13. The system according to claim 12, wherein the processor is adapted to determine, prior to the defining of the first search area, (a) multiple locations of elements of interest wherein the multiple location of the elements of interest comprise locations of a mouth of the person, of a left eye of the person, and of a right eye of the person; and (b) the value of the metric parameter in response to at least two locations out of the multiple locations of the elements of interest.

14. The system according to claim 12, wherein the processor is further adapted to define a first search area that is a punctured search area which is defined by an external boundary and by an internal boundary.

15. The system according to claim 14, wherein the processor is further adapted to define an elliptical internal boundary and an elliptical external boundary; wherein an axes of the elliptical internal boundary are half a size of corresponding axes of the elliptical external boundary.

16. The system according to claim 12, wherein the processor is further adapted to generate an intensity data structure, prior to the generating the edge detection data structure, wherein each column of the intensity data structure comprises color information representative of a one-dimensional section of the edge detection search area; and to process the intensity data structure for providing the edge detection data structure.

17. The system according to claim 16, wherein the processor is further adapted to determine, for each of the columns of the intensity data structure, a data structure element that corresponds to a maximal absolute value of derivatives of color values along the one-dimensional section.

18. The system according to claim 12, wherein the processor is further configured to determine an elliptical internal boundary and an elliptical external boundary; wherein a center of the elliptical internal boundary and of the elliptical external boundary is located at coordinates (X0,Y0); wherein X0=eyeLx +0.5*dX ; Y0=eyeLy+0.5*(eyeRy−eyeLy)+ 0.5*dX; wherein eyeLx is an x-axis coordinate of a left eye of the person, eyeRx is an x-axis coordinate of a right eye of the person, eyeLy is an y-axis coordinate of the left eye of the person, eyeRy is an y-axis coordinate of the right eye of the person, and dX=0.72*(eyeRx−eyeLx).

19. The system according to claim 12, wherein each one-dimensional section of the edge detection search area is perpendicular to the boundary of the first search area and crosses the contour of the image of the face of the person exactly once.

20. The system according to claim 12, wherein the processor is further adapted to mask the edge detection data structure for removing areas that correspond to areas of the image that have a color which is within a color range that is responsive to colors of a central face area, prior to the determining of the contour path.

21. The system according to claim 12, further comprising at least one moving part that participates in a creation of a physical artifact that is responsive to the face portion.

22. The system according to claim 12, wherein the processor is further adapted to generate a Hue, Saturation and Brightness (HSV) image of the person; lightening a Hue component of the HSV image of the person; making a Saturation component of the HSV image of the person more colorful and intensifying a Brightness component of the HSV image of the person; and transform the face portion to fit a target space that is included in a target image, and to incorporate the face portion into the target space, to provide a modified target image.

23. A non-transitory computer readable medium having a computer readable code for processing images incorporated therein, the computer readable code including instructions for: (a) defining a first search area in response to a value of a metric parameter and to a location of an element of interest within the image; (b) generating an edge detection data structure, wherein some of the elements of the edge detection data structure are indicative of edges of the image which are located within an edge detection search area that is contained within the first search area; (c) determining a contour path in the edge detection data structure in response to multiple edges of the edge detection data structure, wherein the contour path comprises a single data structure element from each column of the data structure; and (d) retrieving a face portion of the image, wherein the face portion is included within a mask that is responsive to the contour path; wherein each column of the edge detection data structure comprises color information representative of a one-dimensional section of the edge detection search area; wherein each one-dimensional section of the edge detection search area is either perpendicular to a boundary of the first search area, have a same origin as other one-dimensional sections of the edge detection search area or crosses the contour of the image of the face of the person exactly once.

* * * * *